United States Patent [19]

Dopp et al.

[11] Patent Number: 5,637,117
[45] Date of Patent: Jun. 10, 1997

[54] METHOD OF HARDENING A METAL CURRENT COLLECTING STRIP OF AN AIR CATHODE AND A METHOD OF MAKING A BUTTON TYPE BATTERY

[75] Inventors: Robert B. Dopp, Madison; John E. Oltman, Mount Horeb; Joseph L. Passaniti, Madison, all of Wis.

[73] Assignee: Rayovac Corporation, Madison, Wis.

[21] Appl. No.: 479,361

[22] Filed: Jun. 7, 1995

Related U.S. Application Data

[62] Division of Ser. No. 208,450, Mar. 9, 1994, Pat. No. 5,587,259.

[51] Int. Cl.$^6$ .................................................. H01M 10/04
[52] U.S. Cl. .......................... 29/623.1; 429/157; 429/233
[58] Field of Search .................................... 429/124, 130, 429/164, 157, 233, 237, 241, 245; 29/623.1

[56] References Cited

U.S. PATENT DOCUMENTS

| Re. 31,413 | 10/1983 | Taggard | 429/27 |
|---|---|---|---|
| 2,596,485 | 5/1952 | Jaffee. | |
| 3,640,770 | 2/1972 | Zito, Jr.. | |
| 3,746,580 | 7/1973 | Aker et al. | 136/86 A |
| 4,209,574 | 6/1980 | Ruetschi. | |
| 4,254,593 | 3/1981 | Feuerborn | 51/245 |
| 4,343,869 | 8/1982 | Altman et al. | 429/27 |
| 4,369,569 | 1/1983 | Dopp | 29/623.2 |
| 4,791,035 | 12/1988 | Reichner. | |
| 5,064,734 | 11/1991 | Nazmy | 429/33 |

*Primary Examiner*—M. Nuzzolillo
*Attorney, Agent, or Firm*—Thomas D. Wilhelm; Brian R. Tumm

[57] ABSTRACT

A metal current collecting substrate for an air cathode in an electrochemical metal air cell is provided for, wherein the substrate is hardened by one of the steps of sandblasting, shotblasting, plastic deformation of the substrate below the recrystallization temperature range of the metal thereof, and heating the substrate to above the transformation temperature of the metal thereof followed by quenching the substrate below the transformation temperature of the metal thereof. Catalytically active materials, most preferably a mixture of carbon and manganese dioxide, are pressed or otherwise disposed upon the hardened substrate. The substrate is capable of being connected to electrical circuitry. Most preferably, the substrate is a metal screen that has been hardened, roughened and pitted by sandblasting before the catalytically active materials are disposed thereupon, and before the substrate is incorporated into an electrochemical metal air cell.

6 Claims, 3 Drawing Sheets

METHOD OF HARDENING A METAL CURRENT COLLECTING STRIP OF AN AIR CATHODE AND A METHOD OF MAKING A BUTTON TYPE BATTERY

This is a divisional of application Ser. No. 08/208,450 filed on 9 Mar. 1994, now U.S. Pat. No. 5,587,259.

BACKGROUND

This invention relates to electrochemical cells having metal anodes and air cathodes, commonly known as metal air cells. More specifically, this invention relates to air cathodes and the current collecting substrates thereof, and methods of hardening such substrates prior to their introduction into metal air cells.

The recent increase in small electrically powered devices has increased the demand for very small electrochemical cells, usually disc-like or pellet-like in appearance, and commonly referred to as button cells. Such cells, which are often approximately the size of garment buttons, have diameters ranging up to about 1.0 inch and heights ranging up to about 0.60 inches. The small size and limited amount of electrochemically-active material contained in these small metal-air cells results in considerable attention being directed to improving the capacity of such cells.

Metal air cells are electrochemical cells where the oxygen in the air is the cathode material and a metal material is the anode material. In many instances the preferred anode material is zinc. Metal air cells convert atmospheric oxygen to hydroxide in the air cathode, the hydroxide then migrating to the anode, where it causes the metal contained therein to oxidize. In metal air cells, air enters the cell through one or more air ingress holes in the bottom of the cathode container, the holes generally being in close proximity to an air cathode disposed within the cell. Air diffuses into the air cathode, where the oxygen in the air reacts with water to form hydroxide.

Generally, the air cathode of a metal air cell is composed of a mixture of catalytically active materials disposed upon a current collecting substrate capable of being connected to electrical circuitry, most often through a conductive cathode container. More particularly, the catalytically active materials typically are composed of manganese dioxide and carbon, and the current collecting substrate usually comprises a cross-bonded screen having nickel strands woven therein, or a fine mesh expanded nickel screen.

Several prior art disclosures have been made suggesting the use of nickel screens in air cathodes for electrochemical cells, or suggesting shotblasting or sandblasting of wire, including:

| Country | Patent Number | Inventor/Applicant | Issue Date |
|---------|---------------|--------------------|-----------|
| U.S.A. | 3,746,580 | Aker et al. | 1973 |
| U.S.A. | 4,209,574 | Ruetschi | 1980 |
| U.S.A. | 4,254,593 | Paulfeuerbom | 1981 |
| U.S.A | 4,343,869 | Oltman et al. | 1982 |
| U.S.A. | 4,369,569 | Dopp | 1983 |
| U.S.A. | Re. 31,413 | Jaggard | 1983 |

Aker et al., in U.S. Pat. No. 3,746,580, disclose a gas depolarizable galvanic cell having a metallic grid or screen, preferably of nickel, onto which is pressed a porous, wet or liquid proofed catalyst composition comprising carbon and a wet polymer.

In U.S. Pat. No. 4,209,574, Ruetschi discloses a primary alkaline cell having a nickel screen disc onto which is disposed silver oxide or mercuric oxide.

Paulfeuerborn, in U.S. Pat. No. 4,254,593, discloses a machine for shot or sand blasting wire or rod-like materials.

Oltman et al., in U.S. Pat. No. 4,343,869, disclose an improved metal oxygen button cell having a mesh, film, or screen current collector comprising conductive metal such as nickel or stainless steel.

In U.S. Pat. No. 4,369,568, Dopp discloses an improved metal air button cell having a mesh, film, or screen current collector comprising a conductive metal such as nickel or stainless steel.

In U.S. Pat. No. Re. 31,413, Jaggard discloses a button type gas depolarized electrochemical cell having a current collecting member or screen.

We discovered that the internal resistance of metal air cells is a function, inter alia, of the amount of physical and electrical contact between the catalytically active materials and the current collecting substrate. As the amount of such contact decreases, cell internal resistance increases. One means of increasing the amount of physical and electrical contact between the catalytically active materials and the current collecting substrate is to increase the amount of surface area provided by the current collecting substrate, and available for the attachment of catalytically active materials thereto.

The pulse capability of metal air cells is also a function of the amount of electrical and physical contact between the carbon and the current collecting substrate. The greater the amount of such contact, the lower the electrical resistance therebetween, and the greater the pulse capability. High cell internal resistance may also cause a voltage deficiency at high rates of current drain therefrom, or when large short-lived current pulses are withdrawn therefrom.

We tested many different commercially available metal-air cells and found that their internal resistances were often too high for applications requiring high current drain rates. In those tests, typical IR losses across the internal resistances of the cells averaged around 100 mV when a 150 ohm (8 mA) load was connected thereacross. Because the closed circuit voltage of a cell having such a large internal resistance averages around 1.1 volts under a 150 ohm load, and because many devices like hearing aids have cut-off voltages between about 1.05 and 1.10 volts, a small increase in cell internal resistance can render the cell incapable of producing voltage sufficient to operate such devices.

High internal resistances in button cells often result from structural deformation of the current collecting substrate during crimping of the cell upon closure, where the deformation is of sufficient magnitude to cause inadequate physical and electrical contact between the substrate and the interior sidewall of the cathode container. Additionally, when a current collecting substrate deforms structurally during crimping of a cell upon closure, the outer periphery of the sealing gasket attached to the bottom surface of the air cathode often deforms in accordance therewith, thus increasing the likelihood of electrolyte leaking from a cell.

In metal air cells, the cathode is catalytic and not consumable. Hence, additional capacity for metal air cells is typically provided for by adding more metal anode material and electrolyte. In metal air cells, therefore, capacity is usually limited by the amount of anode material in the cell. That is, cell capacity is directly related to the amount of electrochemically active and consumable anode material present in the cell, the amount depending in turn on the internal cell volume available for the anode material. An important objective of metal air cell developers, therefore, is to decrease the volume occupied by the various internal cell structural components, thereby increasing the amount of internal cell volume available for anode material.

One volume-consuming internal cell structural component is the current collecting substrate. Previous attempts to reduce the volume of this structure often led to a decrease in cell performance, however, because they were usually directed solely to decreasing the diameter of the metal wire comprising the current collecting substrate. Using such decreased diameter wire often caused a marked increase in impedance failures because substantial deformation of the wire typically occurred upon crimping of the cell during closure.

Therefore, it is an object of the present invention to increase the amount of physical and electrical contact between the catalytically active material and the current collecting substrate of air cathodes in metal air cells.

It is another object of the present invention to increase the amount of physical and electrical contact between the current collecting substrates and the inner sidewalls of cathode containers in metal air cells.

It is yet another object of the present invention to increase the surface areas of current collecting substrates in metal air cells.

It is still yet another object of the present invention to improve the performance of metal air cells under pulse and high current drain conditions.

It is yet still another object of the present invention to decrease the number of metal air cells made having high internal resistance due to structural deformation of the current collecting substrate.

A further object of the present invention is to increase the hardness of current collecting substrates in metal air cells, thereby increasing their strength and rigidity.

A further object yet of the present invention is to reduce the number of metal-air cells made having electrolyte leaking therefrom by increasing the strength or rigidity of the current collecting substrate.

Yet a further object of the present invention is to reduce the volume of the current collecting substrate, thereby increasing the internal capacity of metal-air cells so made.

Other objects and advantages will become apparent from the following summary and description of the invention.

SUMMARY

The present invention is directed to a current collecting substrate of an air cathode in a metal air cell that attains the above objects. A novel hardened current collecting substrate for an air cathode in a metal air electrochemical cell is provided for.

One object of the present invention is attained in a current collecting substrate in an air cathode of an electrochemical metal-air cell having a metal anode, where the substrate comprises a metal structure capable of being connected to electrical circuitry and having a mean hardness exceeding about 110 micro-Vickers. In less preferred embodiments, the metal structure has a mean hardness exceeding about 115, 120, 125, 130, or 135 micro-Vickers.

Another object of the present invention is attained in a current collecting substrate in an air cathode of an electrochemical metal-cell having a metal anode, where the substrate comprises a metal structure capable of being connected to electrical circuitry and having a mean number of grain boundaries counted per 0.001" exceeding about 1.90 grain boundaries. In less preferred embodiments, the metal structure has a mean number of grain boundaries counted per 0.001" exceeding about 1.95, 1.97, 2.00, or 2.30 grain boundaries.

Another object yet of the present invention is attained in an electrochemical metal-air button cell having a metal anode, and an air cathode, the air cathode comprising a metal screen capable of being connected to electrical circuitry and a catalytically active layer being disposed upon the substrate and being impregnated with alkaline electrolyte, where the screen has a mean hardness exceeding about 110 micro-Vickers.

Yet another object of the present invention is attained in a method of hardening a screen of an air cathode for a metal-air cell comprising the step of one of sandblasting, shotblasting, plastic deformation of the screen below the recrystallization temperature range of the metal thereof, heating the substrate to above the transformation temperature of the metal thereof followed by quenching the screen below the transformation temperature of the metal thereof.

A further object of the present invention is attained in a an electrochemical metal air cell having a metal anode and an air cathode, the air cathode comprising a metal screen capable of being connected to electrical circuitry, a catalytically active layer being disposed upon the screen and being impregnated with alkaline electrolyte, where the screen has been hardened by one of the steps of sandblasting, shotblasting, plastic deformation of the screen below the recrystallization temperature range of the metal thereof, and heating the screen to above the transformation temperature of the metal thereof followed by quenching the screen below the transformation temperature of the metal thereof.

The substrate of the present invention may comprise metal selected from the group consisting of nickel, NICKEL 200™, silver, titanium, cobalt, copper, gold, palladium, platinum, steel, stainless steel, other suitable metals and alloys, and plating-substrate combinations and alloys thereof.

If the substrate of the present invention is a metal structure, it may comprise a metal screen, a planar metal member having at least one hole suitable for air ingress disposed therethrough, a woven nickel cross bonded screen, an expanded nickel screen, a support structure comprising a plurality of wires, or a planar support structure comprising a plurality of interconnected members.

If the substrate of the present invention is a metal screen, it may comprise wire having a diameter less than about 0.015 inches, less than about 0.010 inches, between about 0.002 inches and about 0.006 inches, between about 0.003 inches and about 0.005 inches, and about 0.004 inches.

The substrate and air cathode of the present invention can be incorporated into a metal air button cell, usually of the zinc air type. Often there is disposed upon the substrate a catalytically active layer, typically comprising a mixture of activated carbon and manganese dioxide and impregnated with an alkaline electrolyte. Additionally, the current collecting substrate and the catalytically active material can be interposed between a porous barrier layer and an hydrophobic polymeric air diffusion layer.

DRAWINGS

These and other objects, features, aspects, and advantages of the present invention will become better understood with reference to the following description, appended claims, and accompanying drawings where FIG. 1 is a cross-sectional view of a metal-air cell of the present invention;

DESCRIPTION

Figure 1:
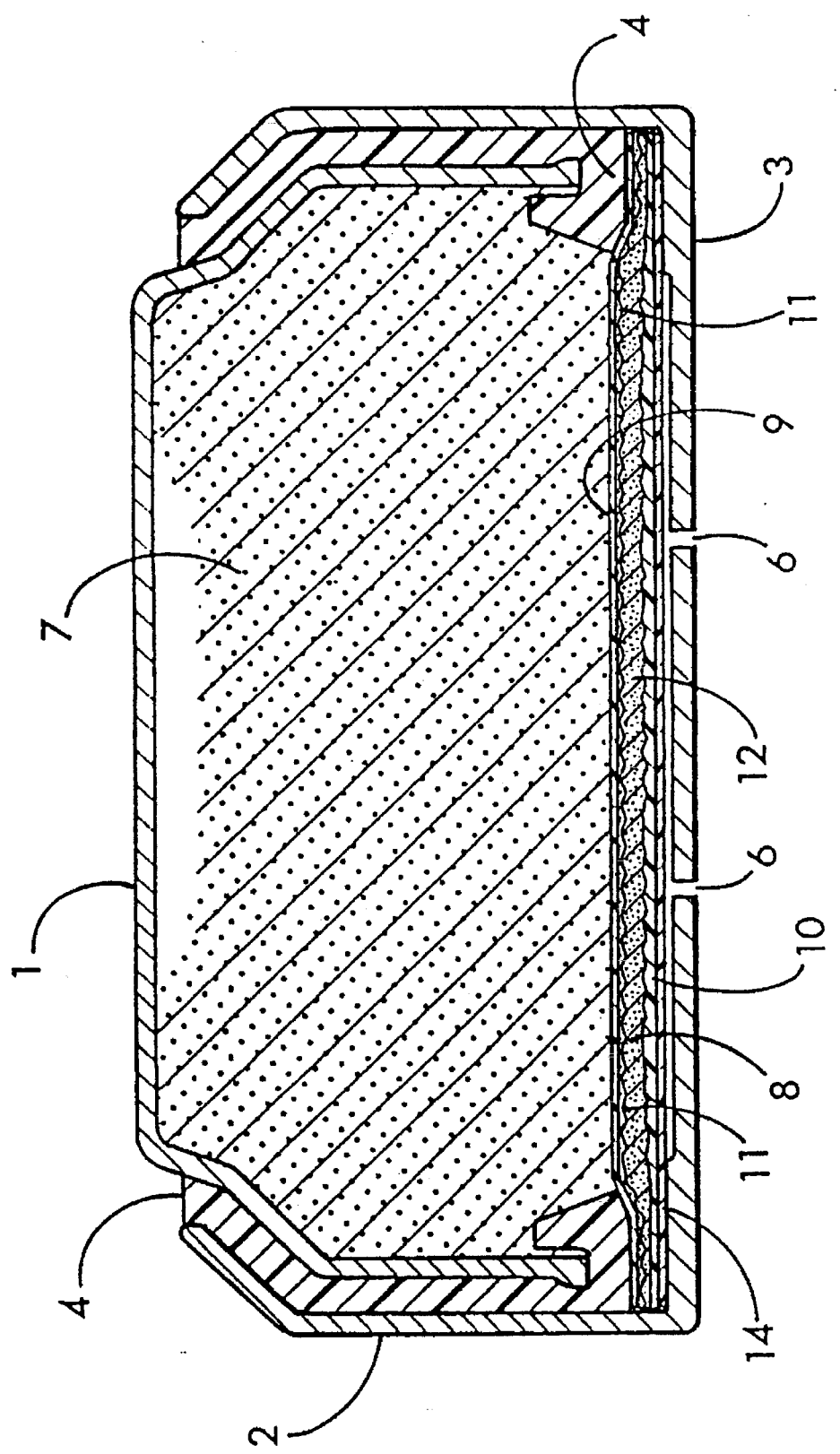

The present invention is directed to a metal-air cathode and cell having a hardened current collecting substrate. Sandblasting or otherwise hardening a metal current collecting substrate causes it to become harder and more rigid.

Here, the term "hardening" includes, but is not limited to, the methods of:

(a) hardening a metal by sandblasting;

(b) hardening a metal by shotblasting;

(c) hardening a metal by plastic deformation thereof below its recrystallization temperature range, and (d) hardening a metal by heating it to a temperature above its transformation temperature followed by quenching it below its transformation temperature to promote deeper hardening thereof and the growth of smaller grains therein.

We refer herein to the methods of hardening a metal by sandblasting, shotblasting, and plastic deformation below its recrystallization temperature range as methods of "work hardening." Examples of plastic deformation below the recrystallization temperature range include mechanical flexure and attendant deformation of the substrate at room temperature, or compression and attendant deformation of the substrate between hard metal rollers.

Sandblasting physically stresses and deforms a metal substrate to change its microstructure and reduce the crystal sizes thereof, thereby enhancing the metal's strength, hardness, and rigidity. Sandblasting also causes the formation of small dimples on the surface of a metal substrate such that the surface becomes pitted and roughened. As a result, the surface area of the substrate is increased, and the amount of physical and electrical contact that can be made between the substrate and the active layer increases. Because a sandblasted current collecting substrate has more physical and electrical contact with the active layer than does an otherwise identical non-sandblasted substrate, the electrical resistance of a substrate so treated is lowered. Thus, cells containing the improved substrate exhibit increased performance under pulse or high current drain conditions relative to cells having conventional, unhardened current collecting substrates.

Fewer failures due to structural deformation of the substrate occur during crimping of cells upon closure when hardened substrates are used. Hardened substrates deform less readily than do unhardened substrates during the closure of cell containers by crimping. The rigid outer peripheries of hardened substrates engage and make better mechanical and electrical contact with cathode container sidewalls, thereby reducing the internal resistance of cells so made.

Conventional, unhardened substrates often flex or deform during closure of cell containers by crimping. Because a sealing gasket is typically coplanar with and bonded lightly to the bottom surface of the air cathode, deformation of the substrate often causes deformation of the sealing gasket. When the substrate deforms the sealing gasket often moves away from its preferred position of tight interposition between the bottom edge of the sealing grommet, the inner sidewall of the cathode container at its outer periphery, and the bottom surface of the cathode container at its bottom surface. Such shifts in the sealing gasket's position can create undesired pathways for the egress of electrolyte from the cell. Because hardened current collecting substrates deform less readily during crimping, fewer shifts in sealing gasket position occur during the crimping process. As a result, cells having hardened substrates exhibit a reduced incidence of electrolyte leakage relative to cells having conventional substrates.

A hardened current collecting substrate screen can be made of smaller diameter wire than can a conventional unhardened screen of similar strength or rigidity. Thus, a decrease in the volume occupied by the improved substrate results relative to that occupied by the conventional substrate. Hence, cells having hardened substrates can have more internal volume than cells having unhardened, conventional substrates.

With reference to the drawings, FIG. 1 shows a cross-section of a metal-air electrochemical cell of the present invention. Electrically conductive anode container 1 has outer sidewalls, and is electrically insulated from electrically conductive cathode container 2 by insulative nylon sealing grommet 4. Electrically conductive cathode container 2 has inner sidewalls contiguous with the bottom inner surface of end wall 3, the bottom inner surface being perforated by at least one air ingress hole 6. Air cathode 12 is interposed between the bottom inner surface of end wall 3 and anode-electrolyte mass 7. Anode electrolyte mass 7 comprises a mixture of zinc powder and alkaline electrolyte, the electrolyte comprising about 2% zinc oxide, about 68% water, and about 30% potassium hydroxide. Anode container 1 contains anode electrolyte mass 7, and is assembled such that the periphery of the open end thereof is pressed upon electrically insulative sealing grommet 4, which is squeezed between the inner sidewall of cathode container 2 and the outer sidewall of anode container 1 by deformation of cathode container 2. Electrically insulative sealing grommet 4 prevents the passage of electrical current between cathode container 2 and anode container 1.

Electrical and physical contact of air cathode 12 with cathode container 2 is accomplished by engaging the outer periphery of metal current collecting substrate 11 with the inner sidewall of cathode container 2. Current collecting substrate 11, a disc-shaped metal screen having a diameter approximately equalling that of the inside diameter of the bottom portion of cathode container 2, forms a support structure for the various components of air cathode 12, also disc-shaped. Air cathode 12, capable of being connected to electrical circuitry, has a top surface and a bottom surface. The bottom surface is in close proximity to the bottom inner surface of end wall 3, and the outer peripheries of the top and bottom surfaces are compressed between the bottom edge of sealing grommet 4 and the bottom inner surface of end wall 3. The top surface of air cathode 12 engages or is in close proximity to anode electrolyte mass 7. A catalytically active layer impregnated with alkaline electrolyte is disposed upon the substrate of air cathode 12. The outer peripheral edge of the substrate is in physical and electrical contact with the inner sidewall of the cathode container, the screen having been hardened by one of the steps of the invention disclosed herein.

Most preferably, current collecting substrate 11 is a metal screen that has been sandblasted prior to its incorporation into the air cathode or the metal-air cell. Less preferably, current collecting substrate 11 is a metal screen that has been otherwise work hardened, or that has been heated above the transformation temperature of the metal thereof followed by quenching it below the transformation temperature of the metal thereof. Most preferably, the metal screen comprises nickel wire woven into a cross-bonded screen spanning the diameter of the cathode container 2, and contacting the cathode container at the bottommost portion of the inner sidewall thereof. Most preferably, sealing gasket 14 comprises a thin disc of PTFE (polytetrafluoroethylene) having about the same diameter as air cathode 12. Sealing gasket 14 is bonded lightly by pressure means to the bottom surface of air cathode 12 prior to placement of the air cathode and sealing gasket inside cathode container 2.

Figure 2:
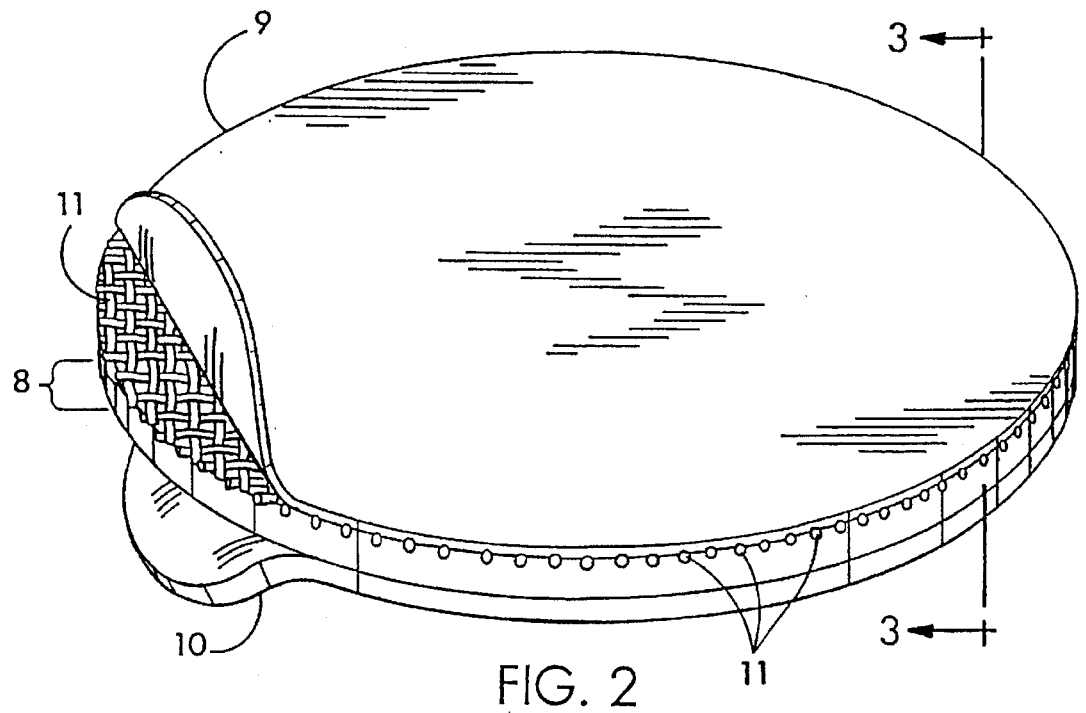
FIG. 2 is a perspective view of the air cathode of the present invention.

FIG. 2 shows a perspective view of the air cathode of the present invention. Catalytically active layer 8 and current collecting substrate 11 are sandwiched between barrier layer 9 and air diffusion layer 10. Barrier layer 9 is a microporous plastic membrane most preferably comprising polypropylene, and having the primary function of preventing anodic zinc particles from coming into physical contact with catalytically active layer 8. Barrier layer 9 also permits hydroxyl ions and water to pass therethrough. Less preferably, barrier layer 9 may comprise polypropylene, nylon polyethylene, polyvinyl dichloride, or any other suitable micro-porous plastic or polymeric material. Air diffusion layer 10 is a microporous polymeric membrane which permits the passage of air therethrough at a controlled rate, and which most preferably limits the current density produced by the cell to a maximum of about 100 milliamperes per square centimeter. Air diffusion layer 10 is also impervious to battery electrolyte, and most preferably comprises PTFE. A polymeric halogenated hydrocarbon binder is usually distributed substantially evenly throughout catalytically active layer 8. Most preferably, such a binder is PTFE and comprises about 12% by dry weight of catalytically active layer 8.

Figure 3:
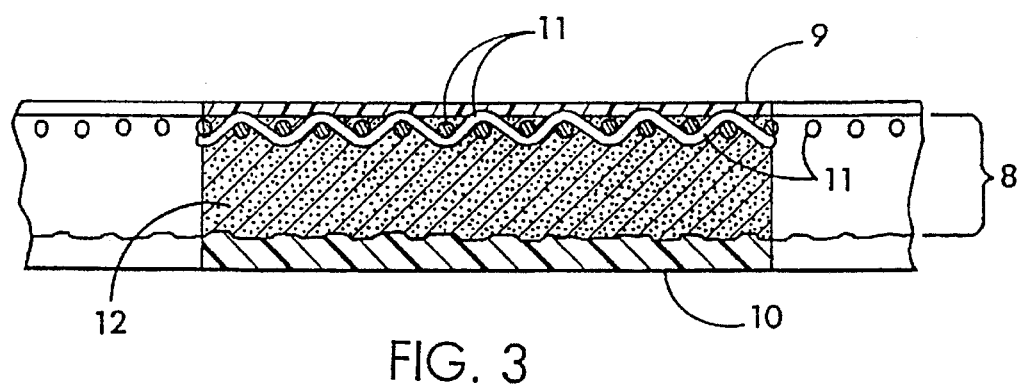
FIG. 3 is an enlarged cross-sectional view of the air cathode of the present invention.

FIG. 3 is an enlarged perspective view of the air cathode of the present invention. Current collecting substrate 11 is capable of being connected to electrical circuitry, and is a woven nickel cross bonded screen comprising interconnected woven wire strands between about 0.004 inches and about 0.005 inches. In 675A and 13A size zinc air cells, 0.005" diameter wire is most suitable, while 0.004" diameter wire is most suitable for 312A and 10A size zinc air cells.

In the preferred embodiment, current collecting substrate 11 is 40 mesh cross-bonded nickel screen, wherein the wire thereof is "NICKEL 200™," a type of metal wire manufactured and sold by National Standard of Corbin, Ky. Cross-bonding of the wire strands comprising the metal screen is accomplished by heating the woven wire screen in a hydrogen gas reducing atmosphere at temperatures sufficient to soften the metal, and pressing the screen between rollers while the metal is still soft. When the screen cools, the wire strands comprising the screen are sintered together where wire strands intersect at right angles, thus creating a strong, cross-bonded screen.

NICKEL 200™ alloy is characterized in having the following nominal chemical composition, where the percentages shown are approximate weight percentages: Nickel (Ni): 99.5%; Iron (Fe): 0.15%; Copper (Cu): 0.05%; Magnesium (Mn): 0.25%; Silicon (Si): 0.05%; Carbon (C): 0.06%. The foregoing percentages vary somewhat, and some chemical constituents such as carbon and silicon may not be present in detectable amounts in the NICKEL 200™ alloy, otherwise referred to in the claims and specification hereof specifically as "nickel alloy".

In its most preferred embodiment, current collecting substrate 11 is 40 mesh "NICKEL 200™" cross-bonded wire screen that has been sandblasted for about 0.5 seconds with GRANUSIL™ Grade 4060 sand ejected at 34 to 90 psi from a Trinco Dry Blast Model 20AP2 sandblaster, the nozzle of which is held about 6 inches from the screen. GRANUSIL™ Grade 4060 sand is available from Unimin Corporation of Portage, Wis. The Trinco sandblaster is available from Trinity Tool Company of Fraser, Mich. Most preferably, both sides of the screen are sandblasted in accordance with the foregoing process.

GRANUSIL™ Grade 4060 sand is a conventional industrial grade used in many sandblasting applications. Particle size analysis of GRANUSIL™ Grade 4060 sand yields the following mean ASTM E-11 mesh sieve analysis characteristics, where the percentages shown are typical mean percentages of the amount of sand retained by individual sieve meshes of the indicated sizes: 16: 0%; 20: 0.2%; 30: 14.7%; 40: 51.8%; 50: 23.2%; 70: 8.3%; 100: 1.8%; 140: 0.2%; 200: 0%; 270: 0%; PAN: 0%.

Analysis of the physical properties of GRANUSIL™ Grade 4060 sand yields the following characteristics: mineral type: quartz (petrographic test method); shape/hardness: rounded grains, 7.0 Mohs (visual test method); moisture content: less than 0.1% (ASTM C-566 test method); specific gravity: 2.65 (ASTM C-128 test method); bulk density, aerated and compacted, respectively: 92–95 and 98–100 lb/ft$^3$ (ASTM C-29 test method).

Chemical analysis of GRANUSIL™ Grade 4060 sand shows that it contains the following constituents and corresponding mean weight percents: silicon dioxide ($SiO_2$): 99.721%; iron oxide ($Fe_2O_3$): 0.019%; aluminum oxide ($Al_2O_3$): 0.085%; calcium oxide (CaO): 0.011%; titanium dioxide ($TiO_2$): 0.016%; magnesium oxide (MgO): 0.010%; potassium oxide ($K_2O$): 0.019%; sodium oxide ($Na_2O$): 0.010%; loss on ignition (L.O.I.): 0.109%.

Catalytically active layer 8 in FIG. 3 forms a matrix surrounding electrically conductive nickel metal cross bonded screen 11, and comprises a mixture of catalytically active materials such as carbon, manganese dioxide, and PTFE binder, the binder being distributed substantially evenly throughout catalytically active layer 8. Catalytically active layer 8 may be pressed, poured, or otherwise disposed upon substrate 11, depending on the manufacturing process used to produce the air cathode of the present invention.

In the most preferred embodiment of the present invention, catalytically active layer 8 comprises a mixture of pulverized PWA activated carbon, 12% by dry weight PTFE as a binder, and manganese dioxide. The manganese dioxide may be introduced as a finely divided and pulverized powder or as an aqueous solution of potassium permanganate as described in U.S. patent application Ser. No. 08/015,641 entitled "Metal-Air Cathode and Cell Having Manganese Compounds of Valence State +2," the disclosure of which is hereby incorporated by reference. PWA pulverized activated carbon is available from the Activated Carbon Division of the Calgon Corporation in Pittsburgh, Pa.

Catalytically active layer 8 and current collecting substrate 11 are sandwiched between barrier layer 9 and air diffusion layer 10. Barrier layer 9 most preferably comprises polypropylene, or may comprise any other suitable microporous plastic membrane. Air diffusion layer 10 may be an hydrophobic polymeric membrane, and most preferably comprises PTFE.

Non-sandblasted current collecting substrates made with 0.005" diameter wire exhibit fewer resistance failures than do similar substrates made using 0.004" diameter wire. We observed that 0.004" diameter wire deforms with relative ease upon closure of a cell by crimping and measured resistance failure rates of about 23% when non-sandblasted current collecting substrates of 0.004" diameter were inserted in button cells. As the degree of substrate deformation increases, the likelihood of cell electrolyte leakage increases. To avoid electrolyte leakage and high internal cell resistance problems, therefore, 0.005" diameter wire is typically used in button cells.

Surprisingly, we discovered that sandblasting substrates made of 0.004" diameter wire reduced the rate at which resistance failures occurred to about 3%, about the same resistance failure rate obtained using non-sandblasted substrates made of 0.005" diameter wire. Sandblasting a current collecting substrate made from smaller diameter wire than would otherwise be used, therefore, produces a screen that performs about as well as a screen made from larger diameter wire and that has the added advantage of providing additional volume for more electrochemically active material.

To determine the relative hardnesses of sandblasted versus non-sandblasted screens, we conducted diamond pyramid hardness tests on current collecting substrate screens made of 0.004" diameter NICKEL 200™ wire. Sixteen of the sample screens were sandblasted, while the sixteen remaining control samples were not sandblasted. Using a Shimadzu Type M/73033 Microhardness Tester, the top central portion of a strand of wire from each screen sample was centered beneath the diamond pyramid of the tester and a 200 gram load was applied thereto. The length of the diagonal impression made by the diamond pyramid subjected to the 200 gram load was measured under a microscope for each sample. The hardness of each sample was calculated in micro-Vickers using the following equation:

$$Hv = \frac{1854.4\,(P)}{d^2} \qquad \text{(eq. 1)}$$

where Hv=the diamond pyramid hardness number in micro-Vickers, P=load in grams, and d=the length in microns of the diagonal impression made in each sample. The results of the hardness tests are shown in Table 1.

TABLE 1

Hardness of Current Collecting Substrates Measured in Diamond-Pyramid Hardness Tests

| Substrate Type (wire diameter, sandblasted or non-sandblasted) | Measured Hardness (micro-Vickers) | | | |
|---|---|---|---|---|
| | Mean | Std. Dev. | Minimum | Maximum |
| 0.004" Diameter Wire Screen, Non-Sandblasted (prior art) | 92.2 | 15.9 | 81.4 | 137.0 |
| 0.004" Diameter Wire Screen, Sandblasted | 144.1 | 21.3 | 118.0 | 196.0 |

Table 1 shows that sandblasted screens are nearly 50% harder than non-sandblasted screens. We calculated 90% and 95% confidence intervals (e.g., α=0.90 and 0.95) for the lower limits of the mean hardnesses of screens of the present invention in respect of prior art screen hardnesses using Table 1 data and the following equation:

$$(1 - \alpha) = [(\bar{x}_1 - \bar{x}_2) \pm z_{\alpha/2} \sqrt{\sigma_1^2/n_1 + \sigma_2^2/n_2}\,] \qquad \text{(eq. 2)}$$

where $\bar{x}_1$ is the mean of a first normal population of sample size $n_1$, the first population having a standard deviation $\sigma_1$, $\bar{x}_2$ is the mean of a second population of sample size $n_2$, the second population having a standard deviation of $\sigma_2$, and $z_{\alpha/2}$ is the area $\Phi(z)$ under the normal curve to the left of z.

(More detailed information concerning the theory and methods of calculating the interval estimators discussed herein may be found in Guttman, I., and Wilks, S. S., *Introductory Engineering Statistics*, John Wiley & Sons, Inc., New York, 965, Section 9.4, pp. 141–143.)

For screens of the present invention, and for a 90% confidence interval, the lower limit of mean hardness calculated using equation 2 and Table 1 data is 109 micro-Vickers. For screens of the present invention, and for a 95% confidence interval, the lower limit of mean hardness calculated using equation 2 and Table 1 data is 111 micro-Vickers.

In respect of prior art metal substrates, and as used in the specification herein, therefore, the term "mean hardness" means a mean hardness of a metal substrate that does not exceed about 95 micro-Vickers, where the first standard deviation corresponding thereto does not exceed about 20 micro-Vickers. In respect of the invention disclosed herein, and as used in the specification and claims herein, the term "mean hardness" means a mean hardness of a metal substrate that is greater than or equal to about 110 micro-Vickers, where the first standard deviation corresponding thereto does not exceed about 25 micro-Vickers.

We determined the average number of grains, or crystals, present in the same non-sandblasted and sandblasted screens examined in Table 1. The samples were potted in a bonding resin, and ground using several grades of progressively smaller grinding paper, followed by polishing of the samples with 1.0 and 0.5 micron diameter aluminum powder. The samples were then etched for about 30 seconds in a water solution containing 5% ammonium peroxydisulfate and 5% sodium cyanide. Subsequent microscopic examination under polarized light revealed the boundaries between the individual grains, or crystals, within the wire samples in cross section. The number of grain boundaries so detected was counted across the 0.004" diameter of each wire sample.

Table 2 shows the results of those observations, where the number of grain boundaries counted is normalized to the number of grain boundaries counted per 0.001". (More detailed information concerning our specimen preparation, microstructure determination, microexamination procedures, and the counting of grain boundaries can be found in Mills et al., Ed. *Metals Handbook*, Ninth Ed., Vol. 9, *Metallography and Microstructure*, American Society for Metals, Fourth Printing, 1989, and more particularly in the *Metallographic Techniques*, and the *Metallographic Techniques and Microstructures: Specific Metals and Alloys* sections set forth therein.)

TABLE 2

Number of Grain Boundaries Counted per 0.001" in Current Collecting Substrates

| Substrate Type (wire diameter, sandblasted or non-sandblasted) | Number of Grain Boundaries Counted per 0.001" | | | |
|---|---|---|---|---|
| | Mean | Std. Dev. | Minimum | Maximum |
| 0.004" Diameter Wire Screen, Non-Sandblasted (prior art) | 1.60 | 0.40 | 1.00 | 2.25 |
| 0.004" Diameter Wire Screen, Sandblasted | 2.40 | 0.60 | 1.50 | 3.50 |

Table 1 shows that sandblasting increases screen hardness. Table 2 shows that the sandblasted screens have about 50% more grain boundaries than do the non-sandblasted screens. Those results are consistent with metallurgical principles, since the hardness of a metal and its grain size are inversely related. See pp. 152–155 of "Physical Metallurgy for Engineers," Clark D. S. and Varney, W. R., 6th Edition, 1958, D. Van Nostrand Company, Inc., Princeton, N.J.

For screens of the present invention, and for a 90% confidence interval, the lower limit of the mean number of grain boundaries counted per 0.001" resulting from applying equation 2 to Table 1 data is 1.88 grain boundaries. For screens of the present invention, and for a 95% confidence interval, the lower limit of the mean number of grain boundaries counted per 0.001" resulting from applying equation 2 to Table 1 data is 1.93 grain boundaries.

In respect of prior art metal substrates, and as used in the specification herein, therefore, the term "mean number of grain boundaries counted per 0.001'" means a mean number of grain boundaries counted across a distance of 0.001" in a metal substrate that does not exceed about 1.70 grain boundaries, where the first standard deviation corresponding thereto does not exceed about 0.50 grain boundaries. In respect of the invention disclosed herein, and as used in the specification and claims herein, the term "mean number of grain boundaries counted per 0.001" means a mean number of grain boundaries counted across a distance of 0.001" in a metal substrate that is greater than or equal to about 1.90 grain boundaries, where the first standard deviation corresponding thereto does not exceed about 0.70 grain boundaries.

Sandblasting current collecting substrates also increases significantly the screen contact surface by approximately doubling the surface area thereof. This increase in surface area improves the degree of physical and electrical contact between the catalytically active layer and the current collecting substrate, results in increased pulse capability of the cell, and improves markedly the cell's high rate performance.

To determine the relative electrical resistances of air cathodes having sandblasted substrates versus those having non-sandblasted substrates, half cell voltages and currents were measured using a half cell test apparatus. Two air cathode samples, one having a non-sandblasted 0.004" diameter NICKEL 200™ wire screen for a current collector, and the other having a non-sandblasted 0.005" diameter NICKEL 200™ wire screen for a current collector, were made using the same processes and materials used to manufacture RAYOVAC® 675A zinc air button cells. Two additional air cathode samples were made to the same specifications using the same processes and materials, with the exception that the wire screen current collecting substrates were sandblasted for 0.5 seconds in accordance with the method disclosed hereinabove. Each of the four air cathode samples so made comprised a metal screen current collector having a mixture of catalytically active manganese dioxide and carbon disposed thereupon, the catalytically active material being wetted with an aqueous 30% KOH, 2% zinc electrolyte, and the screen and catalytically active materials being interposed between a bottom air diffusion layer and a top barrier layer.

Each air cathode sample was then placed in a three-electrode gas diffusion half cell test apparatus. The half cell test apparatus comprised an air cathode holder that exposed one square centimeter of the bottom air diffusion layer of each air cathode sample to ambient air by means of an air ingress port, and one square centimeter of the top barrier layer of each air cathode sample to an electrolyte chamber containing an aqueous electrolyte comprising 30% potassium hydroxide and 2% zinc in solution. The electrolyte chamber was equipped with oxygen venting means and an electrolyte ingress means. A platinum counter electrode was located inside the electrolyte chamber, while the air cathode sample served as a working electrode. A zinc metal reference electrode was then placed in contact with the electrolyte of the electrolyte chamber. A potentiostat controlled and adjusted a first voltage across the working electrode-counter electrode pair such that a second voltage present across the working electrode and the reference electrode would remain approximately constant. The second voltage and the current generated by the air cathode were measured as a function of time using the half cell test apparatus for each of the four air cathode samples.

Figure 4:
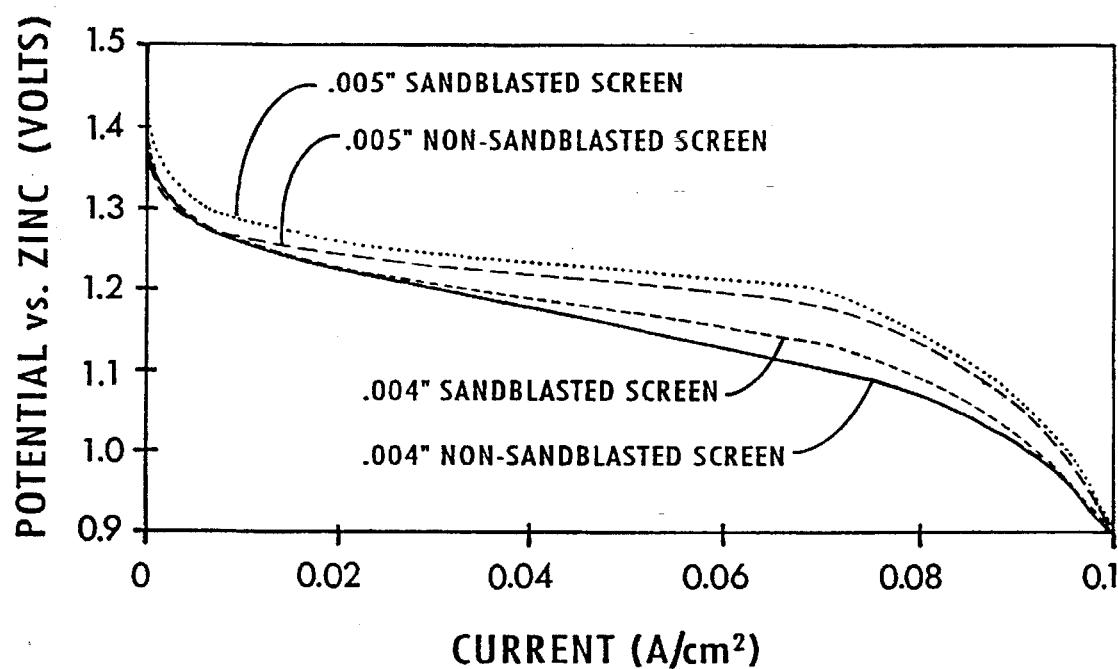
FIG. 4 is a series of half cell voltammograms corresponding to air cathodes of the prior art and to the air cathode of the present invention.

Those measurements were plotted on the linear-scale voltammograms shown in FIG. 4. Air cathode resistances were then calculated using the central constant-slope portions of the voltammograms, resistance being equal to the slopes thereof, where slope equals the change in voltage over the change in current. Table 3 compares the resistances of the four different air cathodes calculated from the half cell test apparatus measurements.

TABLE 3

| Air Cathode Resistances Calculated Using Half Cell Test Apparatus Voltage and Current Measurements | |
|---|---|
| Substrate Type (wire diameter, sandblasted or non-sandblasted) | Calculated Resistance ($\Delta V/\Delta I$, ohms) |
| 0.004" Diameter Wire Screen, Non-Sandblasted (prior art) | 1.50 |
| 0.004" Diameter Wire Screen, Sandblasted | 1.10 |
| 0.005" Diameter Wire Screen, Non-Sandblasted (prior art) | 0.72 |
| 0.005" Diameter Wire Screen, Sandblasted | 0.66 |

Table 3 shows that the electrical resistance of an air cathode having a sandblasted current collecting substrate is much lower than that of an otherwise identical air cathode have a conventional, non-sandblasted substrate.

To determine the relative electrical impedances of zinc air button cells having air cathodes with sandblasted substrates versus those having air cathodes with non-sandblasted substrates, cell impedances were measured using conventional AC voltammetry methods. Four different types of cells were constructed for the impedance measurements. One hundred and sixty test cells were made, wherein sixty RAYOVAC® 675A-size zinc-air button cells were made that conformed to each of the following four specifications:

(a) cells having a non-sandblasted 0.004" diameter Nickel 200 wire screen for a current collector;

(b) cells having a sandblasted 0.004" diameter Nickel 200 wire screen for a current collector;

(c) cells having a non-sandblasted 0.005" diameter Nickel 200 wire screen for a current collector, and (d) cells having a sandblasted 0.005" diameter Nickel 200 wire screen for a current collector.

Electrical impedance measurements were then performed on each cell using conventional AC voltammetry methods, wherein a 1000 Hz AC signal and a slowly varying DC bias signal were simultaneously injected into each of the cells for direct measurement of the electrical impedance of the cell. The results of those electrical impedance measurements are shown in Table 4.

TABLE 4

Zinc Air Button Cell Impedances Measured Using AC Voltammetry Methods

| Substrate Type (wire diameter, sandblasted or non-sandblasted) | Measured Impedance (ohms) | | | |
|---|---|---|---|---|
| | Mean | Minimum | Maximum | Std. Dev. |
| 0.004" Diameter Wire Screen, Non-Sandblasted (prior art) | 14.60 | 3.20 | 102.40 | 21.34 |
| 0.004" Diameter Wire Screen, Sandblasted | 4.68 | 3.10 | 42.60 | 6.98 |
| 0.005" Diameter Wire Screen, Non-Sandblasted (prior art) | 3.48 | 3.20 | 5.20 | 0.26 |
| 0.005" Diameter Wire Screen, Sandblasted | 3.37 | 3.10 | 5.90 | 0.38 |

Table 4 shows that cells having sandblasted screens have lower electrical impedances than do cells having non-sandblasted screens. The reduction in cell electrical impedance due to sandblasting is especially pronounced in cells made having 0.004" diameter wire screens, where cell electrical impedance is reduced on average by about three times and the variability in cell electrical impedance is reduced substantially.

Of the sixty cells made having non-sandblasted 0.004" diameter wire screens, sixteen had electrical impedances exceeding five ohms. Among those sixteen cells, we discovered that the measured high impedances were caused by poor physical and electrical contact between the outer peripheries of the screens and the inner sidewalls of the cathode cans. Of the sixty cells made having sandblasted 0.004" diameter wire screens, only two had electrical impedances exceeding five ohms. We confirmed that those two failures were also caused by poor electrical and physical contact between the outer peripheries of the screens and the inner sidewalls of the cathode cans. Our electrical impedance measurements and cell inspections confirm that sandblasting hardens current collecting substrates and reduces significantly the number of cells made having high impedances.

While the present invention has been described in connection with a specific embodiment, it is understood that modifications and variations may be resorted to without departing from the spirit and scope of the invention. As those of normal skill in the art will readily appreciate, such modifications and variations, together with other equivalent embodiments, are within the purview and scope of the appended claims.

We claim:

1. A method of fabricating a button-size metal-air electrochemical cell, including a metal cathode current collector therein, the method comprising the steps of:

(a) hardening a metal current collecting substrate by one of the steps of (i) sandblasting, (ii) shotblasting, and (iii) plastic deformation of the metal current collecting substrate below the recrystallization temperature range of the metal thereof and subsequent heating of the substrate to above the transformation temperature of the metal thereof followed by quenching the substrate below the transformation temperature of the metal thereof to thereby make the metal cathode current collector; and (b) incorporating the so hardened metal cathode current collector in the button-size metal-air electrochemical cell.

2. The method of claim 1, wherein the metal current collecting substrate is selected from the group consisting of a metal screen, a planar metal member having at least one hole suitable for air ingress disposed therethrough, a woven nickel cross bonded screen, an expanded nickel screen, a support structure comprising a plurality of wires, and a planar support structure comprising a plurality of interconnected members.

3. The method of claim 2, wherein the substrate comprises metal selected from the group consisting of nickel, Nickel 200, silver, cobalt, titanium, copper, gold, palladium, platinum, steel, stainless steel, and plating-substrate combinations and alloys thereof.

4. A method of fabricating a button-size metal-air electrochemical cell, including a metal cathode current collector therein, the method comprising the shape of:

(a) hardening a metal current collecting substrate by one of the steps of (i) shotblasting, and (ii) plastic deformation of the metal current collecting substrate below the recrystallization temperature range of the metal thereof and subsequent heating the substrate to above the transformation temperature of the metal thereof followed by quenching the substrate below the transformation temperature of the metal thereof to thereby make the metal cathode current collector; and (b) incorporating the so hardened metal cathode current collector in the button-size metal-air electrochemical cell.

5. The method of claim 4, wherein the metal current collecting substrate is selected from the group consisting of a metal screen, a planar metal member having at least one hole suitable for air ingress disposed therethrough, a woven nickel cross bonded screen, an expanded nickel screen, a support structure comprising a plurality of wires, and a planar support structure comprising a plurality of interconnected members.

6. The method of claim 5, wherein the substrate comprises metal selected from the group consisting of nickel, Nickel 200, silver, cobalt, titanium, copper, gold, palladium, platinum, steel, stainless steel, and plating-substrate combinations and alloys thereof.

* * * * *